(12) United States Patent
Yamaguchi et al.

(10) Patent No.: US 9,205,827 B2
(45) Date of Patent: Dec. 8, 2015

(54) CONTROL APPARATUS AND CONTROL METHOD FOR VEHICLE

(75) Inventors: Katsuhiko Yamaguchi, Nisshin (JP); Eiji Fukushiro, Tokai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/129,770

(22) PCT Filed: Jul. 7, 2011

(86) PCT No.: PCT/JP2011/065540
§ 371 (c)(1),
(2), (4) Date: Dec. 27, 2013

(87) PCT Pub. No.: WO2013/005325
PCT Pub. Date: Jan. 10, 2013

(65) Prior Publication Data
US 2014/0141934 A1  May 22, 2014

(51) Int. Cl.
| | |
|---|---|
| *B60W 10/10* | (2012.01) |
| *B60K 6/445* | (2007.10) |
| *B60W 50/08* | (2012.01) |
| *B60W 50/14* | (2012.01) |
| *B60W 10/06* | (2006.01) |
| *B60W 20/00* | (2006.01) |
| *F16H 63/42* | (2006.01) |
| *F16H 59/02* | (2006.01) |

(52) U.S. Cl.
CPC ............... *B60W 10/10* (2013.01); *B60K 6/445* (2013.01); *B60W 10/06* (2013.01); *B60W 20/00* (2013.01); *B60W 50/082* (2013.01); *B60W 50/14* (2013.01); *F16H 63/42* (2013.01); *B60K 2350/1092* (2013.01); *F16H 2059/0221* (2013.01); *F16H 2063/426* (2013.01); *Y02T 10/6239* (2013.01); *Y10T 477/68* (2015.01)

(58) Field of Classification Search
None
See application file for complete search history.

(56) References Cited

U.S. PATENT DOCUMENTS

| | | | | |
|---|---|---|---|---|
| 5,089,965 | A | * | 2/1992 | Braun .............................. 701/52 |
| 5,436,833 | A | * | 7/1995 | Janecke ........................ 701/52 |
| 2003/0232680 | A1 | | 12/2003 | Matsunaga et al. |
| 2006/0014610 | A1 | | 1/2006 | Matsunaga et al. |
| 2006/0289210 | A1 | | 12/2006 | Yoshimi |
| 2008/0146407 | A1 | | 6/2008 | Tuckfield |
| 2008/0153651 | A1 | | 6/2008 | Matsubara et al. |

FOREIGN PATENT DOCUMENTS

| | | |
|---|---|---|
| EP | 1 860 354 A1 | 11/2007 |
| EP | 2 075 493 A2 | 7/2009 |
| JP | 05-223153 A | 8/1993 |
| JP | 2005-326027 A | 11/2005 |

(Continued)

*Primary Examiner* — Derek D Knight
*Assistant Examiner* — Timothy M Hannon
(74) *Attorney, Agent, or Firm* — Sughrue Mion, PLLC

(57) ABSTRACT

An ECU selects, in accordance with operation by a driver, either one of a manual shift mode in which a shift range can be manually changed through the operation by the driver and an engine rotation speed is controlled in accordance with a selected shift range and an automatic shift mode in which the engine rotation speed is controlled so as to reduce an amount of fuel consumption as compared with that in the manual shift mode. The driver is recommended to make a change from the manual shift mode to the automatic shift mode when the manual shift mode is selected.

7 Claims, 9 Drawing Sheets

(56) References Cited

FOREIGN PATENT DOCUMENTS

| | | |
|---|---|---|
| JP | 2007-315535 A | 12/2007 |
| JP | 2008-138827 A | 6/2008 |
| JP | 2008-144858 | 6/2008 |
| JP | 2009-156420 A | 7/2009 |

* cited by examiner

CONTROL APPARATUS AND CONTROL METHOD FOR VEHICLE

CROSS REFERENCE TO RELATED APPLICATIONS

This application is a National Stage of International Application No. PCT/JP2011/065540 filed Jul. 7, 2011, the contents of all of which are incorporated herein by reference in their entirety.

TECHNICAL FIELD

The present invention relates to a control apparatus and a control method for a vehicle, and particularly to a technique of recommending a driver to change a control mode.

BACKGROUND ART

There have been known a hybrid vehicle on which an engine and an electric motor are mounted, or an electric vehicle including a travel distance extending function (range extender). In these vehicles, the engine and the electric motor are coupled by, for example, a planetary gear unit. The planetary gear unit and the electric motor constitute an electrical continuously variable transmission. Therefore, the engine rotation speed can be increased and decreased regardless of the vehicle speed. The engine rotation speed is generally controlled such that the thermal efficiency of the engine is optimized.

If the engine rotation speed is set regardless of the vehicle speed, a driver cannot manually select a ratio between the engine rotation speed and the rotation speed of an axle, i.e., a gear ratio. However, in the vehicle such as the hybrid vehicle as well, there is a demand to provide the driver with an operation experience of selecting the gear ratio, similarly to a general vehicle on which only an engine is mounted as a driving source. In order to respond to such a demand, in some hybrid vehicles, a pseudo gear ratio can be changed by increasing and decreasing the engine rotation speed in accordance with manual operation by the driver.

On the other hand, when the vehicle is configured such that the driver can select the gear ratio, an inappropriate gear ratio may be maintained. As one solution to this problem, Japanese Patent Laying-Open No. 2008-138827 (PTL 1) discloses giving, to the driver, a guide to the shifting operation in relation to the shift mode or gear when shifting to a shift gear by manual operation is determined as inappropriate.

CITATION LIST

Patent Literature

PTL 1: Japanese Patent Laying-Open No. 2008-138827

SUMMARY OF INVENTION

Technical Problem

However, in the vehicle such as the hybrid vehicle, the fuel efficiency deteriorates even when the gear ratio selected by the driver is not inappropriate. For example, when the engine rotation speed is increased during deceleration to achieve pseudo downshift, for example, the kinetic energy lost by friction of the engine increases. Therefore, the kinetic energy that can be recovered by regeneration decreases. As a result, the overall energy efficiency deteriorates. Therefore, it is required to encourage the driver to select a control mode with higher fuel efficiency.

Solution to Problem

In an embodiment, a control apparatus for a vehicle on which an engine is mounted, includes: a control unit selecting, in accordance with operation by a driver, either one of a first mode in which a shift range can be manually changed through the operation by the driver and a rotation speed of the engine is controlled in accordance with a selected shift range and a second mode in which the rotation speed of the engine is controlled so as to reduce an amount of fuel consumption as compared with that in the first mode; and a recommendation unit recommending the driver to make a change from the first mode to the second mode when the first mode is selected.

With this configuration, in the control apparatus for the vehicle on which the engine is mounted, when the driver selects the first mode in which the shift range can be manually changed through the operation by the driver, the driver is encouraged to make the change to the second mode in which the amount of fuel consumption is reduced as compared with that in the first mode.

In another embodiment, an electric motor coupled to the engine is further mounted on the vehicle. The control unit increases the rotation speed of the engine during deceleration when the first mode is selected, as compared with when the second mode is selected.

With this configuration, in the first mode, the rotation speed of the engine is increased in accordance with the selected shift range to achieve pseudo downshift, for example. When this first mode is selected, the driver is recommended to make the change from the first mode to the second mode.

In still another embodiment, a braking apparatus decelerating the vehicle is further mounted on the vehicle. The recommendation unit restricts recommendation to make the change from the first mode to the second mode, when the braking apparatus is abnormal.

With this configuration, when reduction in kinetic energy by friction of the engine is required, i.e., when engine brake is required, the change to the second mode in which the braking force by the engine brake cannot be easily obtained is not encouraged.

In a further embodiment, the first mode is a manual shift mode. The second mode is an automatic shift mode.

With this configuration, the change from the manual shift mode to the automatic shift mode is encouraged.

Advantageous Effects of Invention

According to an embodiment, the driver is encouraged to make the change to the second mode in which the amount of fuel consumption is reduced as compared with that in the first mode.

DESCRIPTION OF EMBODIMENTS

Figure 1:
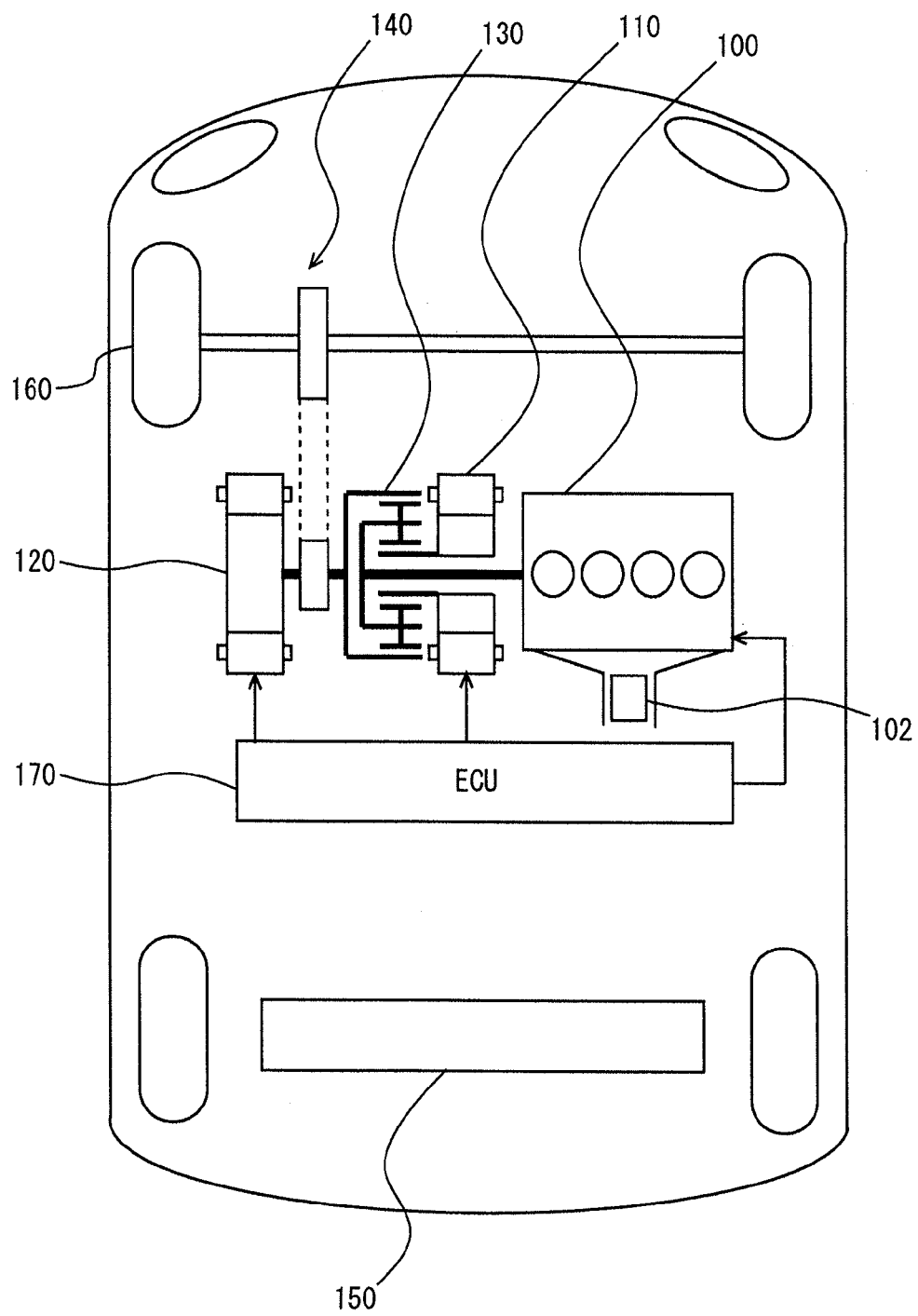
FIG. 1 is a schematic configuration diagram showing a hybrid vehicle.

Referring to figures, an embodiment of the present invention will be described below. In the description below, the same components are given the same reference characters. Their names and functions are also the same. Hence, they will not be described in detail repeatedly.

Referring to FIG. 1, an engine 100, a first motor generator 110, a second motor generator 120, a power split device 130, a speed reducer 140, and a battery 150 are mounted on a hybrid vehicle. Although a hybrid vehicle that does not have a function of charging by an external power supply will be illustrated by way of example in the description below, a plug-in hybrid vehicle having the function of charging by the external power supply may be used.

Engine 100, first motor generator 110, second motor generator 120, and battery 150 are controlled by an ECU (Electronic Control Unit) 170. ECU 170 may be divided into a plurality of ECUs.

The vehicle travels using driving power provided from at least one of engine 100 and second motor generator 120. In other words, one or both of engine 100 and second motor generator 120 is/are automatically selected as a driving source in accordance with the driving conditions.

For example, engine 100 and second motor generator 120 are controlled in accordance with a result of operation of an accelerator pedal by the driver. When the amount of operation of the accelerator pedal (accelerator opening degree) is small and when the vehicle speed is low, the hybrid vehicle travels using only second motor generator 120 as a driving source. In this case, engine 100 is stopped. In some cases, however, engine 100 may be driven for electric power generation and the like.

When the accelerator opening degree is large, when the vehicle speed is high, and when a state of charge (SOC) of battery 150 is small, engine 100 is driven. In this case, the hybrid vehicle travels using only engine 100 or both engine 100 and second motor generator 120 as driving sources.

Engine 100 is an internal combustion engine. An air-fuel mixture burns in a combustion chamber, thereby rotating a crankshaft that is an output shaft. Exhaust gas discharged from engine 100 is purified by a catalyst 102, and then, is discharged outside the vehicle. Catalyst 102 is warmed to a certain temperature, thereby exerting the purifying effect. Catalyst 102 is warmed using heat of the exhaust gas. Catalyst 102 is, for example, a three-way catalyst.

Engine 100, first motor generator 110 and second motor generator 120 are connected to one another via power split device 130. Motive power generated by engine 100 is split by power split device 130 into two paths. One of them is a path for driving front wheels 160 via speed reducer 140. The other is a path for driving first motor generator 110 to generate electric power.

First motor generator 110 is a three-phase alternating current rotating electric machine including a U-phase coil, a V-phase coil and a W-phase coil. First motor generator 110 generates electric power using the motive power generated by engine 100 and split by power split device 130. The electric power generated by first motor generator 110 is used depending on the traveling conditions of the vehicle and the state of charge of battery 150. For example, during normal traveling, the electric power generated by first motor generator 110 is used directly as electric power for driving second motor generator 120. On the other hand, when the SOC of battery 150 is lower than a predetermined value, the electric power generated by first motor generator 110 is stored in battery 150.

When first motor generator 110 serves as a power generator, first motor generator 110 generates negative torque. The negative torque used herein refers to torque serving as a load for engine 100. When first motor generator 110 is supplied with electric power to serve as a motor, first motor generator 110 generates positive torque. The positive torque used herein refers to torque not serving as a load for engine 100, i.e., torque assisting rotation of engine 100. The same holds true for second motor generator 120.

Second motor generator 120 is a three-phase alternating current rotating electric machine including a U-phase coil, a V-phase coil and a W-phase coil. Second motor generator 120 is driven using at least one of the electric power stored in battery 150 and the electric power generated by first motor generator 110.

The driving power generated by second motor generator 120 is transmitted to front wheels 160 via speed reducer 140. In this way, second motor generator 120 assists engine 100, or causes the vehicle to travel using the driving power provided from second motor generator 120. Instead of or in addition to front wheels 160, rear wheels may be driven.

Upon regenerative braking of the hybrid vehicle, front wheels 160 drive second motor generator 120 through speed reducer 140 and second motor generator 120 operates as a power generator. In this way, second motor generator 120 operates as a regenerative brake to convert the braking energy to electric power. The electric power thus generated by second motor generator 120 is stored in battery 150.

Power split device 130 is constituted by a planetary gear including a sun gear, a pinion gear, a carrier, and a ring gear. The pinion gear engages with the sun gear and the ring gear. The carrier rotatably supports the pinion gear. The sun gear is coupled to the rotation shaft of first motor generator 110. The carrier is coupled to the crankshaft of engine 100. The ring gear is coupled to the rotation shaft of second motor generator 120 and speed reducer 140.

Figure 2:
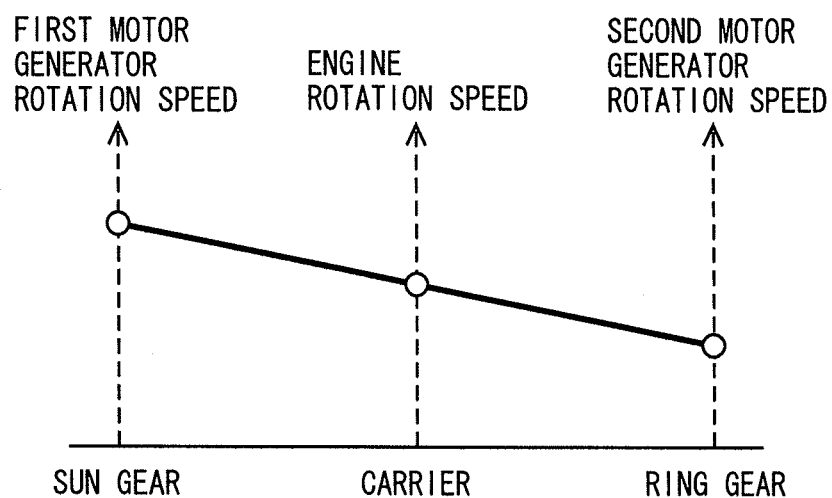
FIG. 2 is a nomographic chart of a power split device.

Since engine 100, first motor generator 110 and second motor generator 120 are coupled to one another through power split device 130 constituted by the planetary gear, the rotation speeds of engine 100, first motor generator 110 and second motor generator 120 are in such a relation that they are connected by a straight line in a nomographic chart as shown in FIG. 2.

Referring to FIG. 1 again, battery 150 is a battery pack constituted by a plurality of battery modules connected in series and each having a plurality of battery cells incorporated therein. Battery 150 has a voltage of, for example, approximately 200 V. Instead of or in addition to battery 150, a capacitor may be used.

Figure 3:
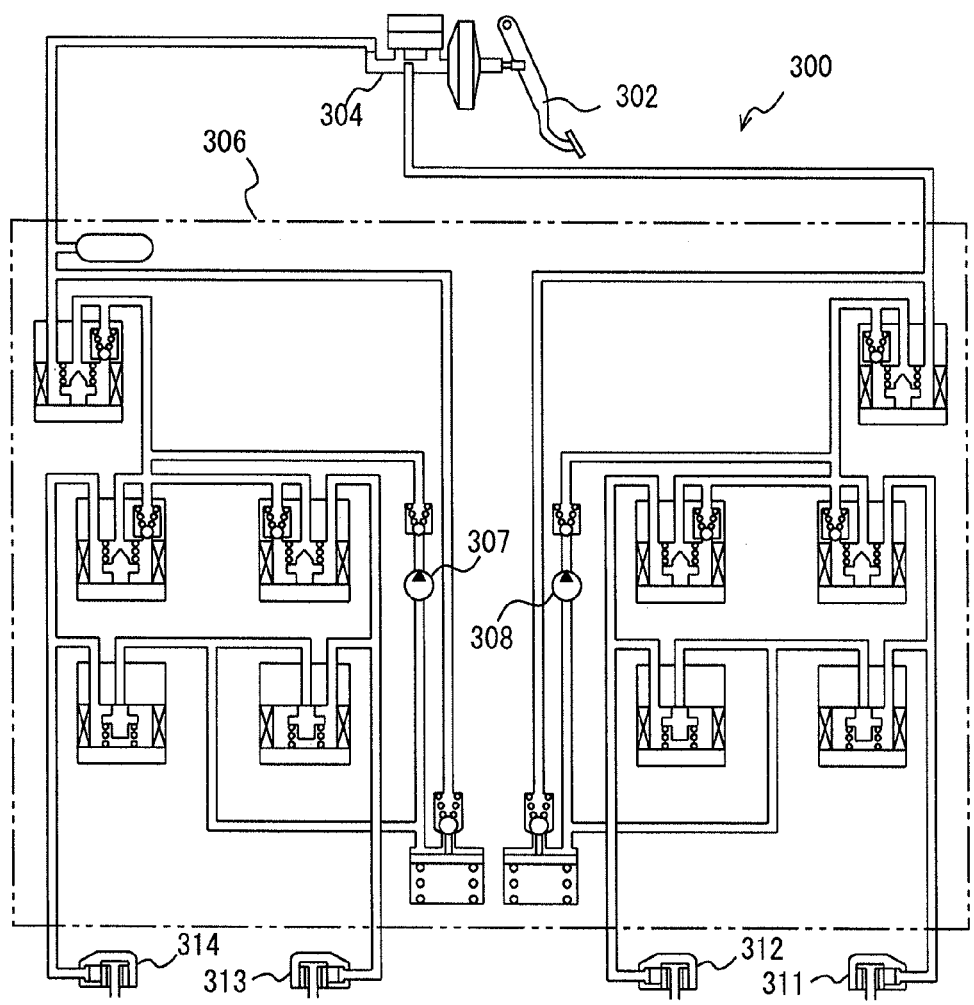
FIG. 3 shows a brake system.

A brake system 300 that applies braking force to the hybrid vehicle will be described with reference to FIG. 3. A brake pedal 302 is coupled to a master cylinder 304. When brake pedal 302 is operated, hydraulic pressure corresponding to the amount of operation of the brake is generated at master cylinder 304.

The hydraulic pressure generated at master cylinder 304 is supplied to calipers 311 to 314 provided at respective wheels via a brake actuator 306 controlled by ECU 170. In other words, when brake pedal 302 is operated, brake actuator 306 is controlled such that the hydraulic pressure generated at master cylinder 304 is supplied to calipers 311 to 314. Supply of the hydraulic pressure to calipers 311 to 314 causes a brake pad to be pressed against a disc rotor. The braking force is applied to the vehicle via friction force between the brake pad and the disc rotor.

Calipers 311 to 314 are supplied with hydraulic pressure generated at brake actuator 306, in addition to the hydraulic pressure corresponding to the amount of operation of brake pedal 302. Brake actuator 306 includes a solenoid valve and pumps 307 and 308.

By controlling opening and closing of the solenoid valve, hydraulic pressure generated at pumps 307 and 308 is supplied to calipers 311 to 314 or is discharged from calipers 311 to 314. As a result, brake hydraulic pressure, i.e., braking force generated by brake system 300 is controlled. The amount of actuation of calipers 311 to 314 corresponds to the hydraulic pressure. It should be noted that electrically-actuated calipers may be provided instead of the hydraulically-actuated calipers. A drum brake may be used instead of a disc brake.

Braking by brake system 300 is controlled by ECU 170 to cooperate with regenerative braking by second motor generator 120. By way of example, the braking force generated by second motor generator 120 and the braking force generated by brake system 300 cooperate with each other such that the braking force generated by brake system 300 makes up a shortfall in the braking force generated as a result of regenerative braking with respect to the braking force defined in accordance with the amount of stepping on brake pedal 302. When only the braking force generated as a result of regenerative braking satisfies the braking force requested by the driver, the braking force generated by brake system 300 is set to zero.

Figure 4:
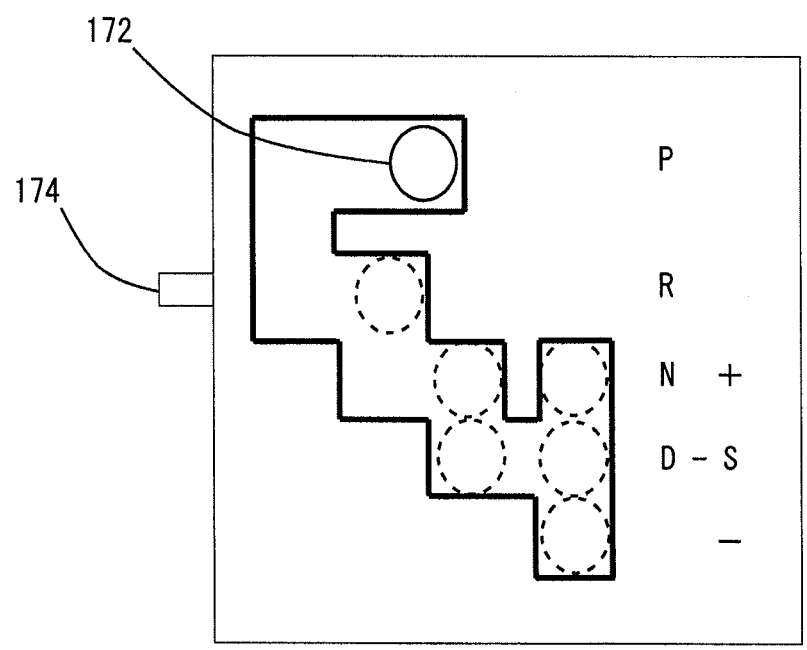
FIG. 4 shows a shift lever and shift positions.

The control mode of engine 100, first motor generator 110 and second motor generator 120 will be described with reference to FIG. 4. In the present embodiment, the control mode of engine 100, first motor generator 110 and second motor generator 120 is selected in accordance with operation of a shift lever 172 by the driver. As shown in FIG. 4, shift lever 172 moves along a shift gate. The control mode is selected in accordance with a position PSH of shift lever 172.

Position PSH of shift lever 172 is detected by a position sensor 174. Position sensor 174 determines whether a contact point provided at a position corresponding to a shift position is ON or OFF, thereby detecting position PSH of shift lever 172.

When position PSH of shift lever 172 is a "parking (P)" position or an "N (neutral)" position, engine 100, first motor generator 110 and second motor generator 120 are controlled such that the vehicle does not have driving power. In this case, control itself over engine 100, first motor generator 110 and second motor generator 120 may be stopped.

When position PSH of shift lever 172 is a "reverse (R)" position, engine 100, first motor generator 110 and second motor generator 120 are controlled such that the vehicle travels rearward with larger driving power as the amount of operation of the accelerator pedal becomes larger. More specifically, control is performed such that engine 100 is stopped and the vehicle travels rearward using only second motor generator 120 as a driving source.

When position PSH of shift lever 172 is a "drive (D)" position, the automatic shift mode is selected. In the automatic shift mode, engine 100, first motor generator 110 and second motor generator 120 are controlled such that the vehicle travels forward with larger driving power as the amount of operation of the accelerator pedal becomes larger.

More specifically, when the driver's request can be satisfied even if only second motor generator 120 is used as a driving source, such as at the time of the start of the vehicle, at the time of low vehicle speed, and at the time of light load, control is performed such that engine 100 is stopped and the vehicle travels forward using only second motor generator 120 as a driving source.

In the traveling state in which the efficiency of engine 100 is good, engine 100 starts up. In this case, control is performed such that the vehicle travels forward using engine 100 as a main driving source.

During acceleration, the driving power of the vehicle is secured by using engine 100 as a driving source, and first motor generator 110 generates electric power by using a part of the motive power of engine 100. Furthermore, the electric power generated by first motor generator 110 is used to drive second motor generator 120 as a driving source, and the driving power of second motor generator 120 is added to the driving power of engine 100.

When the SOC of battery 150 decreases, the driving power of the vehicle is secured by using engine 100 as a driving source, and first motor generator 110 generates electric power by using a part of the motive power of engine 100.

As described above, when the D range is selected as the shift range, engine 100 is driven or stopped depending on the traveling conditions of the vehicle, and thus, engine 100 is operated intermittently.

Figure 5:
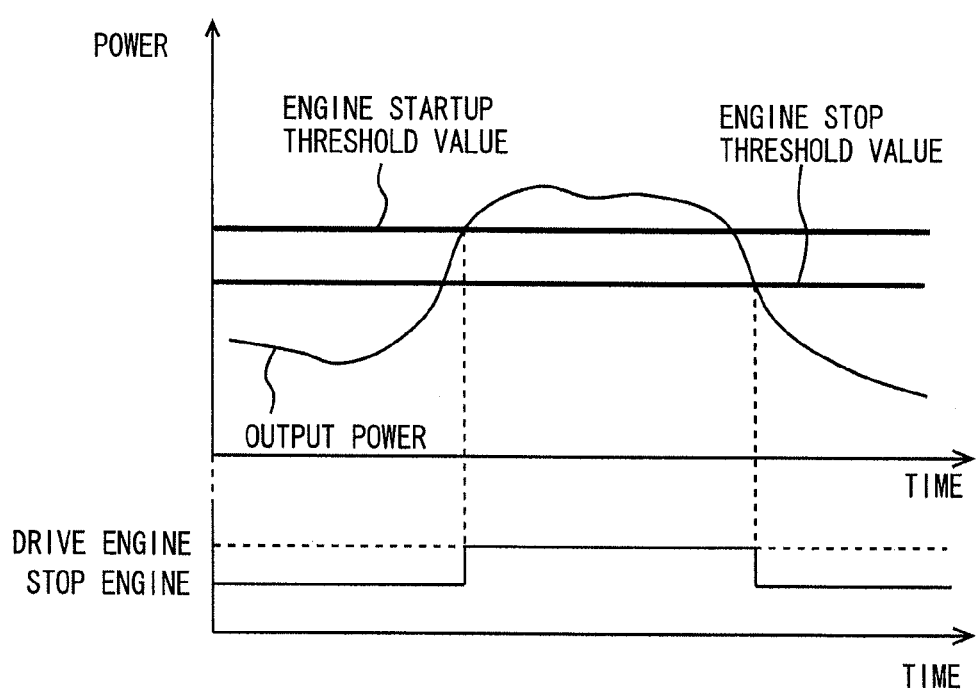
FIG. 5 shows a time period during which an engine is driven and a time period during which the engine is stopped.

The manner of controlling engine 100 in the automatic shift mode will be further described with reference to FIG. 5. As shown in FIG. 5, when the output power of the hybrid vehicle is smaller than an engine startup threshold value, the hybrid vehicle travels using only the driving power of second motor generator 120.

The output power is set as power used for causing the hybrid vehicle to travel. The output power is calculated by ECU 170 in accordance with, for example, a map having the accelerator opening degree, the vehicle speed and the like as parameters. A method for calculating the output power is not limited thereto. The torque, the acceleration, the driving power, the accelerator opening degree and the like may be used instead of the output power.

When the output power of the hybrid vehicle becomes equal to or larger than the engine startup threshold value, engine 100 is driven. As a result, the hybrid vehicle travels using the driving power of engine 100 in addition to or instead of the driving power of second motor generator 120. In addition, the electric power generated by first motor generator 110 using the driving power of engine 100 is directly supplied to second motor generator 120.

Figure 6:
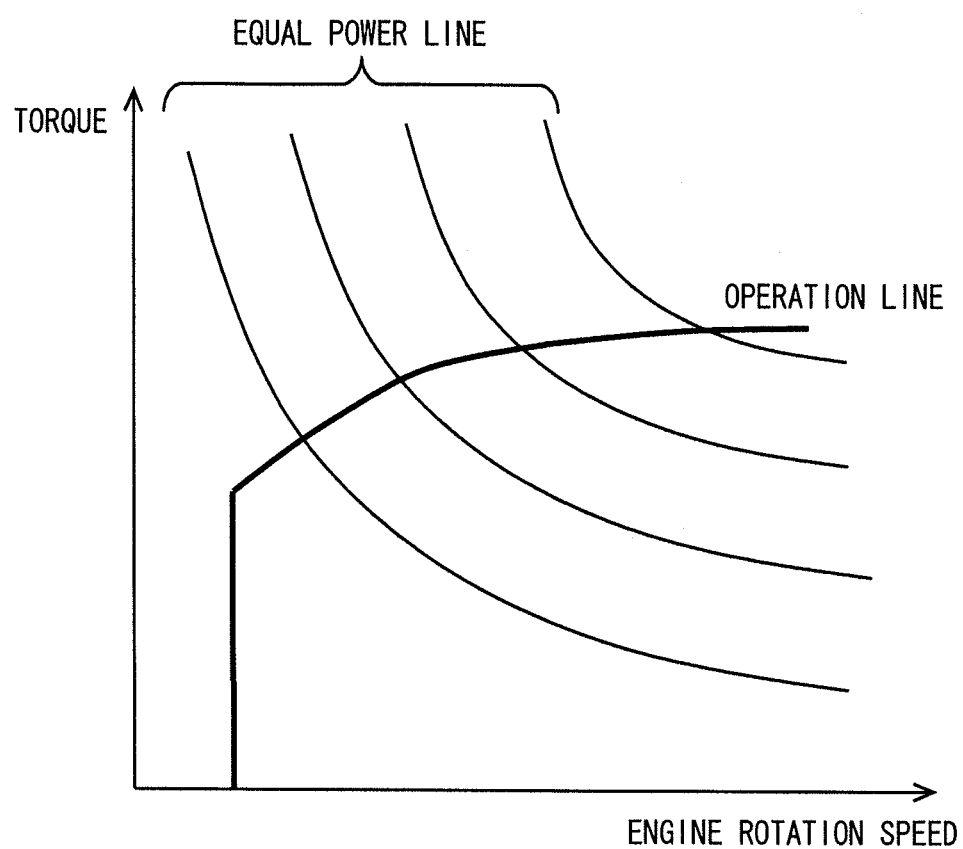
FIG. 6 shows an operation line of the engine.

As shown in FIG. 6, the operating point of engine 100, i.e., engine rotation speed NE and output torque TE are defined by an intersection of the output power and the operation line.

The output power is indicated by an equal power line. The operation line is preset by a developer based on experimental and simulation results. The operation line is set such that engine 100 can be driven to optimize (minimize) the fuel efficiency. In other words, the optimum fuel efficiency is achieved by driving engine 100 along the operation line.

Referring to FIG. 4 again, when position PSH of shift lever 172 is a "sequential shift (S)" position, the manual shift mode is selected. In the manual shift mode, the shift range can be manually changed within the range of, for example, 1 to 6 by the shift operation of moving shift lever 172 back and forth. In the manual shift mode, the engine rotation speed is controlled in accordance with a selected shift range.

In short, in the manual shift mode, sequential shift control is performed, in which control is performed such that the driving power or the braking force of the hybrid vehicle changes in stages by moving shift lever 172 back and forth.

For example, when position PSH of shift lever 172 is the "S" position and when the driver operates shift lever 172 toward the forward part of the vehicle, engine 100, first motor generator 110 and second motor generator 120 are controlled such that engine rotation speed NE decreases like the case where the automatic transmission is upshifted. By way of example, engine rotation speed NE is set to become lower as the selected shift range is higher, i.e., as the number of upshift is larger.

Conversely, when position PSH of shift lever 172 is the "S" position and when the driver operates shift lever 172 toward the backward part of the vehicle during deceleration of the vehicle, engine 100, first motor generator 110 and second motor generator 120 are controlled such that engine rotation speed NE decreases like the case where the automatic transmission is downshifted. By way of example, engine rotation speed NE is set to become higher as the selected shift range is lower, i.e., as the number of downshift is larger.

Figure 7:
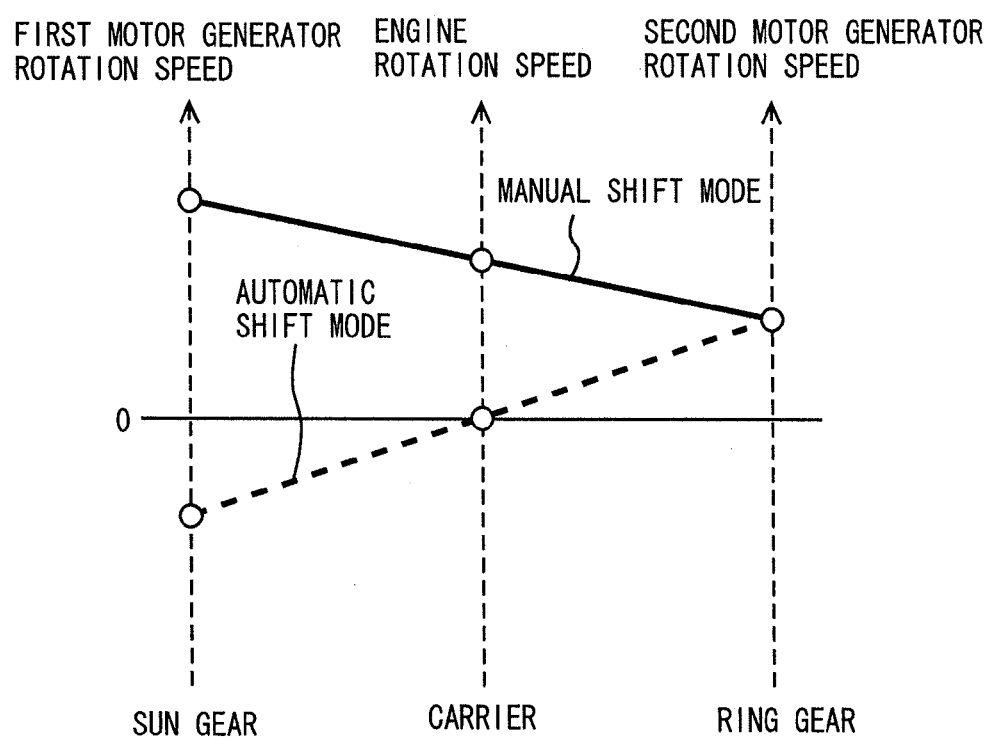
FIG. 7 shows an engine rotation speed NE during deceleration in a manual shift mode and an engine rotation speed NE during deceleration in an automatic shift mode.

More specifically, as shown by a solid line in FIG. 7, assuming that the vehicle speed remains unchanged, engine rotation speed NE is increased by increasing the rotation speed of first motor generator 110. On the other hand, as shown by a broken line in FIG. 7, when the automatic shift mode is selected, engine rotation speed NE is generally zero. In other words, engine 100 is stopped. Therefore, engine rotation speed NE during deceleration is increased when the manual shift mode is selected, as compared with when the automatic shift mode is selected.

When engine rotation speed NE is increased, the kinetic energy lost by friction of engine 100 increases. Therefore, the kinetic energy that can be recovered by regeneration during deceleration decreases. As a result, the state of charge of battery 150 decreases more quickly. Therefore, the duration of driving engine 100 for electric power generation may be prolonged. As a result, the amount of fuel consumed by engine 100 in the manual shift mode is larger than the amount of fuel consumed by engine 100 in the automatic shift mode. In other words, in the automatic shift mode, engine rotation speed NE is controlled so as to reduce the amount of fuel consumption as compared with that in the manual shift mode.

Figure 8:
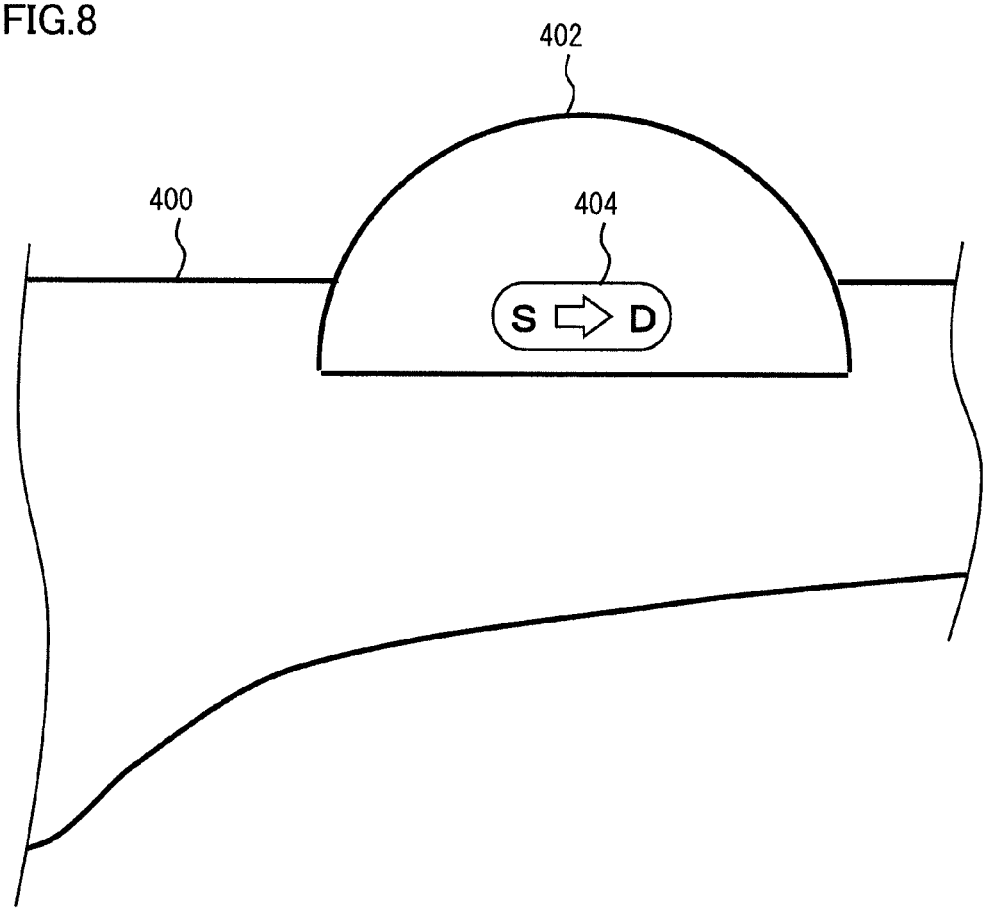
FIG. 8 shows an indicator lamp.

Therefore, the automatic shift mode is more preferable than the manual shift mode in terms of the fuel efficiency. Thus, in the present embodiment, when the manual shift mode is selected, an indicator lamp 404 is turned on or blinks in a meter 402 provided on an instrument panel 400 in front of the driver's seat as shown in FIG. 8. In the present embodiment, indicator lamp 404 is constituted by an arrow and characters of "S" and "D". "S" is written on an area near the start point of the arrow, and "D" is written on an area near the end point. Turning on or blinking of indicator lamp 404 recommends the driver to move shift lever 172 from the "S" position to the "D" position. Therefore, when the manual shift mode is selected, the driver is recommended to make a change from the manual shift mode to the automatic shift mode.

Indicator lamp 404 is not limited to the indicator lamp shown in FIG. 8. Any indicator lamps may be used as indicator lamp 404 as long as they recommend the driver to make the change from the manual shift mode to the automatic shift mode. Text, sound, warning alarm and the like may recommend the driver to make the change from the manual shift mode to the automatic shift mode.

Figure 9:
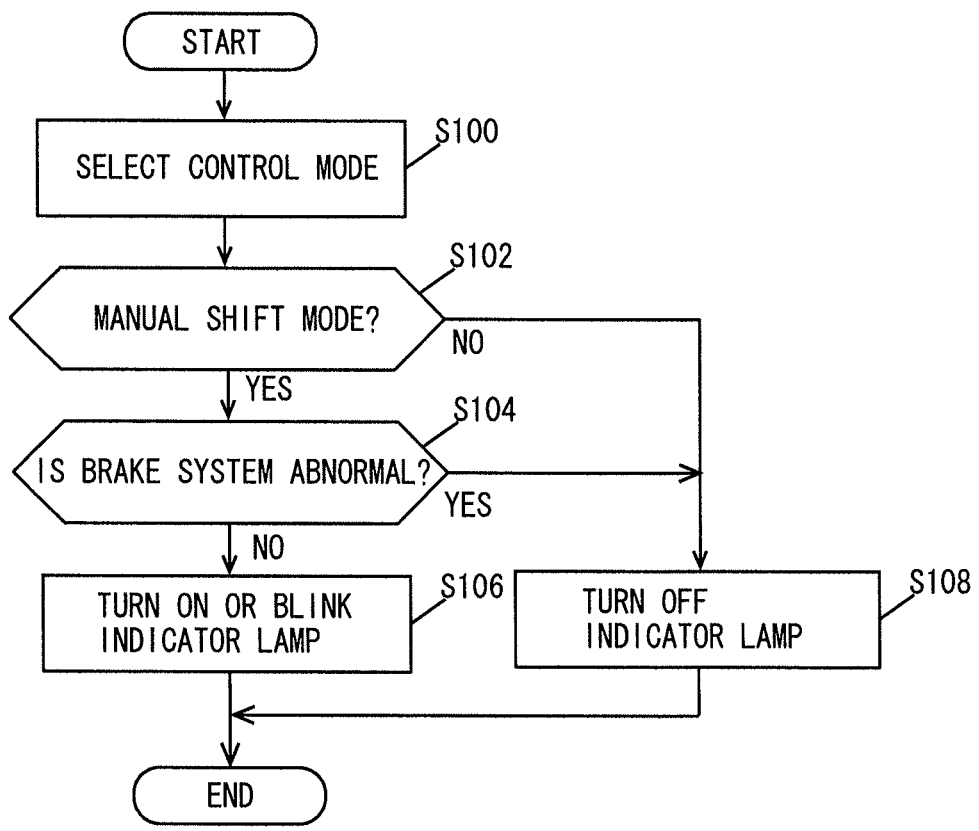
FIG. 9 is a flowchart showing a process executed by an ECU.

A process executed by ECU 170 in the present embodiment will be described with reference to FIG. 9. The process described below may be implemented by software, or may be implemented by hardware, or may be implemented by cooperation of software and hardware.

In step (hereinafter abbreviated as "S") 100, the control mode is selected in accordance with position PSH of shift lever 172. As described above, when position PSH of shift lever 172 is the "D" position, the automatic shift mode is selected. When position PSH of shift lever 172 is the "S" position, the manual shift mode is selected.

In S102, it is determined whether or not the manual shift mode is selected. As described above, when the manual shift mode is selected, engine rotation speed NE during deceleration is increased as compared with when the automatic shift mode is selected.

If the manual shift mode is selected (YES in S102), it is determined in S104 whether or not brake system 300 is abnormal. Since whether or not brake system 300 is abnormal may be determined using a general well-known technique, detailed description thereof will not be repeated here.

If brake system 300 is not abnormal (NO in S104), indicator lamp 404 is turned on or blinks to recommend the driver to make the change from the manual shift mode to the automatic shift mode in S106.

On the other hand, if brake system 300 is abnormal (YES in S104), it is desirable to increase the braking force by engine brake by increasing engine rotation speed NE during deceleration. Therefore, in S108, indicator lamp 404 is turned off. Therefore, recommendation to make the change from the manual shift mode to the automatic shift mode is restricted.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

REFERENCE SIGNS LIST 100 engine; 110 first motor generator; 120 second motor generator; 130 power split device; 170 ECU; 172 shift lever; 174 position sensor; 300 brake system; 302 brake pedal; 304 master cylinder; 306 brake actuator; 307, 308 pump; 311, 312, 313, 314 caliper; 400 instrument panel; 402 meter; 404 indicator lamp

The invention claimed is:

1. A control apparatus for a vehicle on which an engine and an electric motor coupled to said engine are mounted, comprising:
a control unit selecting, in accordance with operation by a driver, either one of a first mode in which a shift range can be manually changed through the operation by the driver and a rotation speed of said engine is controlled in accordance with a selected shift range and a second mode in which the rotation speed of said engine is controlled so as to reduce an amount of fuel consumption as compared with that in said first mode, and increasing the rotation speed of said engine during deceleration when said first mode is selected, as compared with when said second mode is selected; and
a recommendation unit recommending the driver to make a change from said first mode to said second mode when said first mode is selected;
wherein
a braking apparatus other than the engine and the electric motor decelerating said vehicle is further mounted on said vehicle, and
said recommendation unit restricts recommendation to make the change from said first mode to said second mode, when said braking apparatus is abnormal.

2. The control apparatus for a vehicle according to claim 1, wherein
said first mode is a manual shift mode, and
said second mode is an automatic shift mode.

3. The control apparatus for a vehicle according to claim 1, wherein
said braking apparatus is a hydraulic braking apparatus.

4. A control method for a vehicle on which an engine and an electric motor coupled to said engine are mounted, comprising the steps of:
selecting, in accordance with operation by a driver, either one of a first mode in which a shift range can be manually changed through the operation by the driver and a rotation speed of said engine is controlled in accordance with a selected shift range and a second mode in which the rotation speed of said engine is controlled so as to reduce an amount of fuel consumption as compared with that in said first mode;
increasing the rotation speed of said engine during deceleration when said first mode is selected, as compared with when said second mode is selected; and
recommending the driver to make a change from said first mode to said second mode when said first mode is selected;
wherein
a braking apparatus other than the engine and the electric motor decelerating said vehicle is further mounted on said vehicle, and
restricting recommendation to make the change from said first mode to said second mode, when said braking apparatus is abnormal.

5. The control method for a vehicle according to claim 4, wherein
said braking apparatus is a hydraulic braking apparatus.

6. A control apparatus for a vehicle on which an engine and an electric motor coupled to said engine are mounted, comprising:
selection means for selecting, in accordance with operation by a driver, either one of a first mode in which a shift range can be manually changed through the operation by the driver and a rotation speed of said engine is controlled in accordance with a selected shift range and a second mode in which the rotation speed of said engine is controlled so as to reduce an amount of fuel consumption as compared with that in said first mode;
means for increasing the rotation speed of said engine during deceleration when said first mode is selected, as compared with when said second mode is selected; and
recommendation means for recommending the driver to make a change from said first mode to said second mode when said first mode is selected;
wherein
a braking apparatus other than the engine and the electric motor decelerating said vehicle is further mounted on said vehicle, and
said recommendation means restricts recommendation to make the change from said first mode to said second mode, when said braking apparatus is abnormal.

7. The control apparatus for a vehicle according to claim 6, wherein
said braking apparatus is a hydraulic braking apparatus.

* * * * *